United States Patent
Chen et al.

(10) Patent No.: US 8,954,646 B2
(45) Date of Patent: Feb. 10, 2015

(54) METHOD FOR MANAGING A PLURALITY OF BLOCKS OF A FLASH MEMORY, AND ASSOCIATED MEMORY DEVICE AND CONTROLLER THEREOF

(75) Inventors: Bo Chen, San Jose, CA (US); Shuihua Hu, Shanghai (CN); Wei-Qing Li, Shanghai (CN); Xiangrong Li, Beijing (CN)

(73) Assignee: Silicon Motion Inc., Jhubei, Hsinchu County (TW)

(*) Notice: Subject to any disclaimer, the term of this patent is extended or adjusted under 35 U.S.C. 154(b) by 1092 days.

(21) Appl. No.: 12/765,882

(22) Filed: Apr. 23, 2010

(65) Prior Publication Data

US 2011/0055460 A1    Mar. 3, 2011

(30) Foreign Application Priority Data

Sep. 2, 2009 (TW) .............................. 98129600 A

(51) Int. Cl.
  *G06F 12/00* (2006.01)
  *G06F 13/00* (2006.01)
  *G06F 13/28* (2006.01)
  *G06F 12/02* (2006.01)

(52) U.S. Cl.
  CPC .... *G06F 12/0246* (2013.01); *G06F 2212/7201* (2013.01); *G06F 2212/7202* (2013.01)
  USPC .......................................... 711/103; 711/115

(58) Field of Classification Search
  CPC .................... G06F 12/0246; G06F 2212/7205; G11C 16/16
  See application file for complete search history.

(56) References Cited

U.S. PATENT DOCUMENTS

| | | | |
|---|---|---|---|
| 2006/0221719 A1* | 10/2006 | Maeda et al. | 365/189.05 |
| 2008/0126712 A1* | 5/2008 | Mizushima | 711/141 |
| 2008/0270680 A1 | 10/2008 | Chang | |
| 2008/0282024 A1* | 11/2008 | Biswas et al. | 711/103 |
| 2010/0088482 A1* | 4/2010 | Hinz | 711/166 |
| 2010/0095049 A1* | 4/2010 | Manning | 711/103 |
| 2010/0180145 A1* | 7/2010 | Chu | 714/2 |
| 2011/0191521 A1* | 8/2011 | Araki et al. | 711/103 |
| 2012/0179861 A1* | 7/2012 | Mizushima | 711/103 |

* cited by examiner

*Primary Examiner* — Yaima Rigol
(74) *Attorney, Agent, or Firm* — Winston Hsu; Scott Margo

(57) ABSTRACT

A method for managing a plurality of blocks of a Flash memory includes: recording/updating linking information regarding a logical block address, wherein the linking information includes a plurality of physical block addresses linking to the logical block address, and each physical block address represents a block of the plurality of blocks; and when a block represented by a physical block address of the plurality of physical block addresses has no valid page, selectively erasing the block and removing the physical block address from the linking information, wherein when a number of blocks that are within blocks represented by the physical block addresses and have no valid page reaches a predetermined value, erasing all of the blocks that have no valid page and removing physical block addresses thereof from the linking information.

19 Claims, 3 Drawing Sheets

METHOD FOR MANAGING A PLURALITY OF BLOCKS OF A FLASH MEMORY, AND ASSOCIATED MEMORY DEVICE AND CONTROLLER THEREOF

BACKGROUND OF THE INVENTION

1. Field of the Invention

The present invention relates to access to a Flash memory, and more particularly, to a method for managing a plurality of blocks of a Flash memory, and to an associated memory device and a controller thereof.

2. Description of the Prior Art

As technologies of Flash memories progress in recent years, many kinds of portable memory devices, such as memory cards respectively complying with SD/MMC, CF, MS, and XD standards, are widely implemented in various applications. Therefore, the control of access to Flash memories in these portable memory devices has become an important issue.

Taking NAND Flash memories as an example, they can mainly be divided into two types, i.e. Single Level Cell (SLC) Flash memories and Multiple Level Cell (MLC) Flash memories. Each transistor that is considered a memory cell in SLC Flash memories only has two charge levels that respectively represent a logical value 0 and a logical value 1. In addition, the storage capability of each transistor that is considered a memory cell in MLC Flash memories can be fully utilized. More specifically, the voltage for driving memory cells in the MLC Flash memories is typically higher than that in the SLC Flash memories, and different voltage levels can be applied to the memory cells in the MLC Flash memories in order to record information of two bits (e.g. binary values 00, 01, 11, or 10) in a transistor that is considered a memory cell. Theoretically, the storage density of the MLC Flash memories may reach twice the storage density of the SLC Flash memories, which is considered good news for NAND Flash memory manufacturers who encountered a bottleneck of NAND Flash technologies.

As MLC Flash memories are cheaper than SLC Flash memories, and are capable of providing higher capacity than SLC Flash memories while the space is limited, MLC Flash memories have been a main stream for implementation of most portable memory devices on the market. For example, according to the related art, user data will get lost at any time in a situation where the quality of a Flash memory degrades due to long-term use. More particularly, in contrast to the SLC Flash memories, the upper limit of the erase count of each block of the MLC Flash memories is relatively low, which causes the problem of the unstable characteristics to become unacceptable.

Please note that the upper limit of the erase count of each block of Flash memories typically decreases while a new process is utilized. Because of the progress of the process, Flash memory manufacturers may achieve the goal of reducing costs. In this situation, they would be more severely impacted by the unstable characteristics mentioned above. Thus, a novel method is required for enhancing the control of data access to Flash memories, in order to guarantee the completeness of user data.

SUMMARY OF THE INVENTION

It is therefore an objective of the claimed invention to provide a method for managing a plurality of blocks of a Flash memory, and to provide an associated memory device and a controller thereof, in order to solve the above-mentioned problem.

It is another objective of the claimed invention to provide a method for managing a plurality of blocks of a Flash memory, and to provide an associated memory device and a controller thereof, in order to enhance operation performance and decrease the number of merging operations of the blocks within the Flash memory, and even to have no need to perform any merging operation.

It is another objective of the claimed invention to provide a method for managing a plurality of blocks of a Flash memory, and to provide an associated memory device and a controller thereof, in order to slow down the increase of the erase counts of the blocks in the Flash memory. Therefore, in contrast to the related art, portable memory devices that are implemented based upon the present invention surely have a longer lifetime.

According to a preferred embodiment of the claimed invention, a method for managing a plurality of blocks of a Flash memory comprises: recording/updating linking information regarding a logical block address, wherein the linking information comprises a plurality of physical block addresses linking to the logical block address, and each physical block address represents a block of the plurality of blocks; and when a block represented by a physical block address of the plurality of physical block addresses has no valid page, selectively erasing the block and removing the physical block address from the linking information.

While the method mentioned above is disclosed, an associated memory device is further provided. The memory device comprises: a Flash memory comprising a plurality of blocks; and a controller arranged to access the Flash memory and manage the plurality of blocks. In addition, the controller records/updates linking information regarding a logical block address, wherein the linking information comprises a plurality of physical block addresses linking to the logical block address, and each physical block address represents a block of the plurality of blocks. Additionally, when a block represented by a physical block address of the plurality of physical block addresses has no valid page, the controller selectively erases the block and removes the physical block address from the linking information.

While the method mentioned above is disclosed, a controller of a memory device is further provided, where the controller is utilized for accessing a Flash memory comprising a plurality of blocks. The controller comprises: a read only memory (ROM) arranged to store a program code; and a microprocessor arranged to execute the program code to control the access to the Flash memory and manage the plurality of blocks. In addition, the controller that executes the program code by utilizing the microprocessor records/updates linking information regarding a logical block address, wherein the linking information comprises a plurality of physical block addresses linking to the logical block address, and each physical block address represents a block of the plurality of blocks. Additionally, when a block represented by a physical block address of the plurality of physical block addresses has no valid page, the controller that executes the program code by utilizing the microprocessor selectively erases the block and removes the physical block address from the linking information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
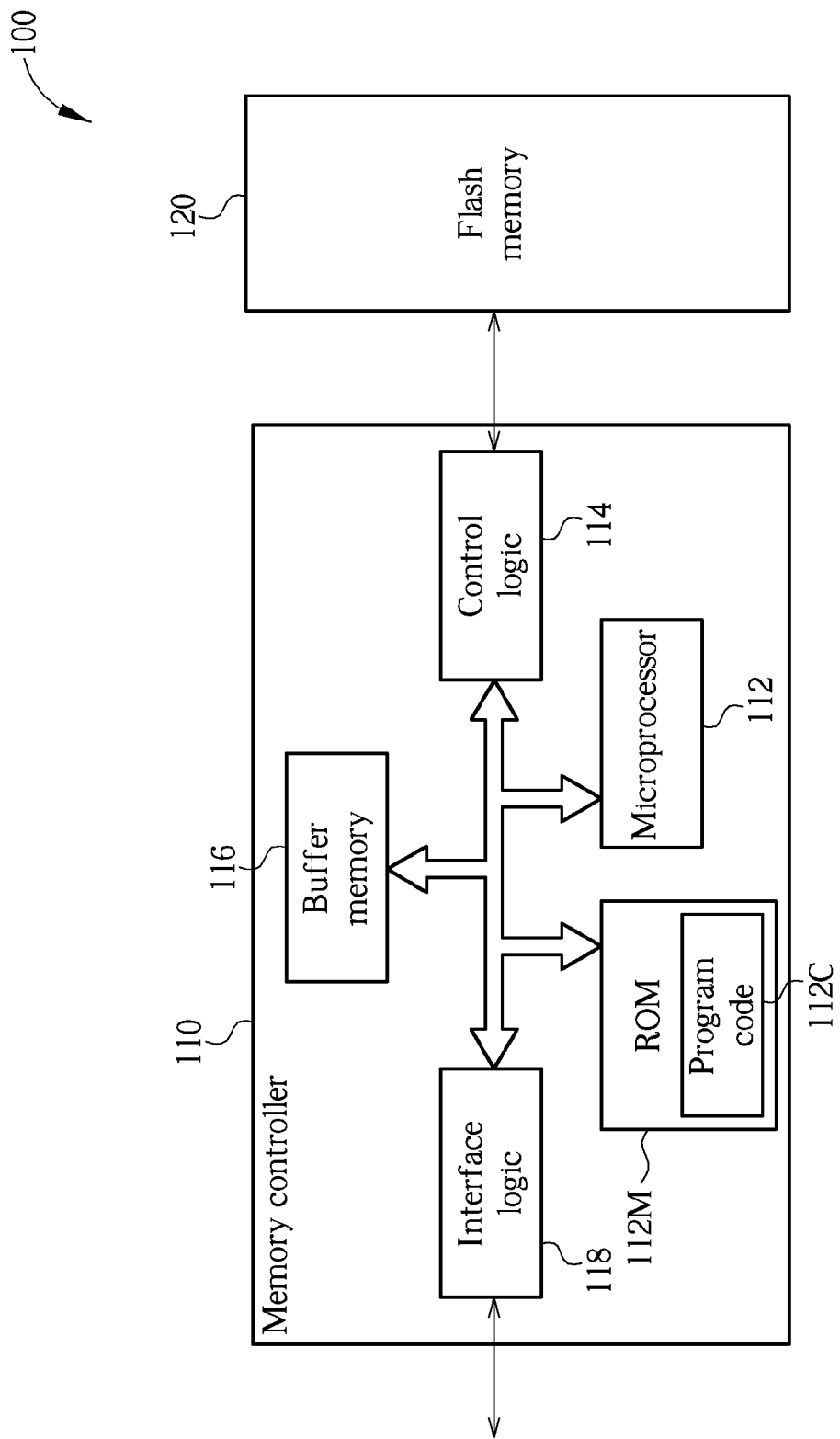
FIG. 1 is a diagram of a memory device according to a first embodiment of the present invention.

Please refer to FIG. 1, which illustrates a diagram of a memory device 100 according to a first embodiment of the present invention. In particular, the memory device 100 of this embodiment is a portable memory device, such as a memory card complying with SD/MMC, CF, MS, or XD standards. The memory device 100 comprises a Flash memory 120, and further comprises a controller arranged to access the Flash memory 120, where the aforementioned controller of this embodiment is a memory controller 110. According to this embodiment, the memory controller 110 comprises a microprocessor 112, a read only memory (ROM) 112M, a control logic 114, a buffer memory 116, and an interface logic 118. The ROM 112M is arranged to store a program code 112C, and the microprocessor 112 is arranged to execute the program code 112C to control the access to the Flash memory 120. Please note that, according to different variations of this embodiment, the program code 112C can be stored in the buffer memory 116 or any other memory.

Typically, the Flash memory 120 comprises a plurality of blocks, and the controller (e.g. the memory controller 110 that executes the program code 112C by utilizing the microprocessor 112) performs data erasure operations on the Flash memory 120 by erasing in units of blocks. In addition, a block can be utilized for recording a specific amount of pages, where the controller mentioned above performs data writing operations on the Flash memory 120 by writing/programming in units of pages.

In practice, the memory controller 110 that executes the program code 112C by utilizing the microprocessor 112 is capable of performing various control operations by utilizing the internal components within the memory controller 110. For example, the memory controller 110 utilizes the control logic 114 to control access to the Flash memory 120 (e.g. operations of accessing at least one block or at least one page), utilizes the buffer memory 116 to perform buffering operations for the memory controller 110, and utilizes the interface logic 118 to communicate with a host device.

According to this embodiment, in addition to accessing the Flash memory 120, the controller is capable of properly managing the plurality of blocks. More specifically, when writing/updating data, the controller can record/update linking information regarding a logical block address, where the linking information comprises a plurality of physical block addresses linking to the logical block address, and each physical block address represents a block of the plurality of blocks. In addition, when a block represented by a physical block address of the plurality of physical block addresses has no valid page, the controller can selectively erase the block and remove the physical block address from the linking information.

Here, a valid page represents a data page having effective data, and more particularly, represents a first physical page that actually links to a certain logic page address. As the controller performs data erasure operations on the Flash memory 120 by erasing in units of blocks, when updating data regarding the logic page address, the controller writes the updated data into a second physical page and replaces the linking relationship between the logic page address and the first physical page with the linking relationship between the logic page address and the second physical page. Thus, the controller cancels the linking relationship between the logic page address and the first physical page. As a result, the first physical page is no longer a valid page, and is regarded as an invalid page.

Figure 2:
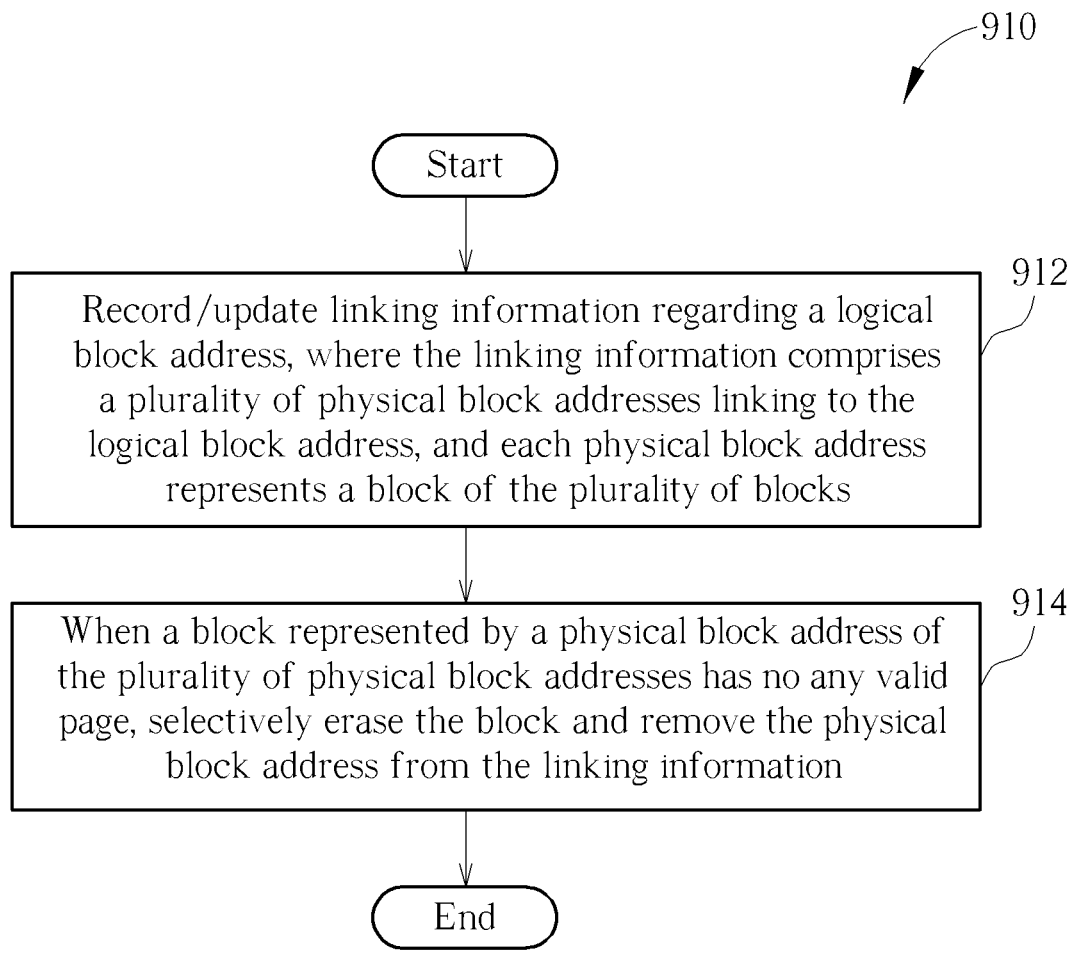
FIG. 2 is a flowchart of a method for managing a plurality of blocks of a Flash memory according to an embodiment of the present invention.

FIG. 2 is a flowchart of a method 910 for managing a plurality of blocks of a Flash memory according to an embodiment of the present invention. The method can be applied to the memory device 100 shown in FIG. 1, and more particularly, to the controller mentioned above (e.g. the memory controller 110 that executes the program code 112C by utilizing the microprocessor 112). In addition, the method can be implemented by utilizing the memory device 100 shown in FIG. 1, and more particularly, by utilizing the controller mentioned above. The method 910 is described as follows.

In Step 912, the aforementioned controller (e.g. the memory controller 110 that executes the program code 112C by utilizing the microprocessor 112) records/updates linking information regarding a logical block address, where the linking information comprises a plurality of physical block addresses linking to the logical block address, and each physical block address represents a block of the plurality of blocks. More particularly, the linking information further comprises current physical page location information, and the current physical page location information is utilized for indicating the location of the latest written physical page regarding the logical block address. In addition, the linking information further comprises other information for the controller's reference. As a result, when it is required to perform data access regarding the logical block address in the future, the controller can access data belonging to the logical block address according to the linking information.

In Step 914, when a block represented by a physical block address of the plurality of physical block addresses has no valid page, the controller selectively erases the block and removes the physical block address from the linking information. For example, when the block represented by the physical block address no longer has any valid page, the controller immediately erases the block and removes the physical block address from the linking information. This is for illustrative purposes only, and is not meant to be a limitation of the present invention. According to a variation of this embodiment, when the block represented by the physical block address no longer has any valid page, the controller triggers an operation of erasing the block and removing the physical block address from the linking information based upon occurrence of a specific event. Thus, the controller can wait for the occurrence of the specific event, and then erase the block and remove the physical block address from the linking information. According to another variation of this embodiment, when the number of blocks that are within blocks represented by the physical block addresses and no longer have any valid page reaches a predetermined value, the controller erases all of the blocks that no longer have any valid page and removes the physical block addresses thereof (i.e. the physical block addresses of the blocks that no longer have any valid page) from the linking information. According to another variation of this embodiment, when the number of blocks represented by the physical block addresses reaches a predetermined value, the controller merges valid pages of at least one portion of blocks within the blocks represented by the physical block addresses into at least one new blank block, and erases the aforementioned at least one portion of blocks and removes the physical block addresses thereof (i.e. the physical block addresses of the above-mentioned at least one portion of blocks) from the linking information. More particularly, in this variation, the aforementioned at least one portion of blocks can be one or more blocks that have the least (or less) valid page(s), within the blocks represented by the physical block addresses.

According to this embodiment, the linking information further comprises page linking information. The controller determines whether the block represented by the physical block address no longer has any valid page according to the page linking information. More particularly, the page linking information comprises a logical-to-physical page linking table. Thus, in the logical-to-physical page linking table, regarding a logical page address belonging to the logical block address, the controller can record/update a corresponding physical block address or the representative information thereof and further record/update a corresponding physical page address. Some implementation details of the linking information are described by referring to FIG. 3.

Figure 3:
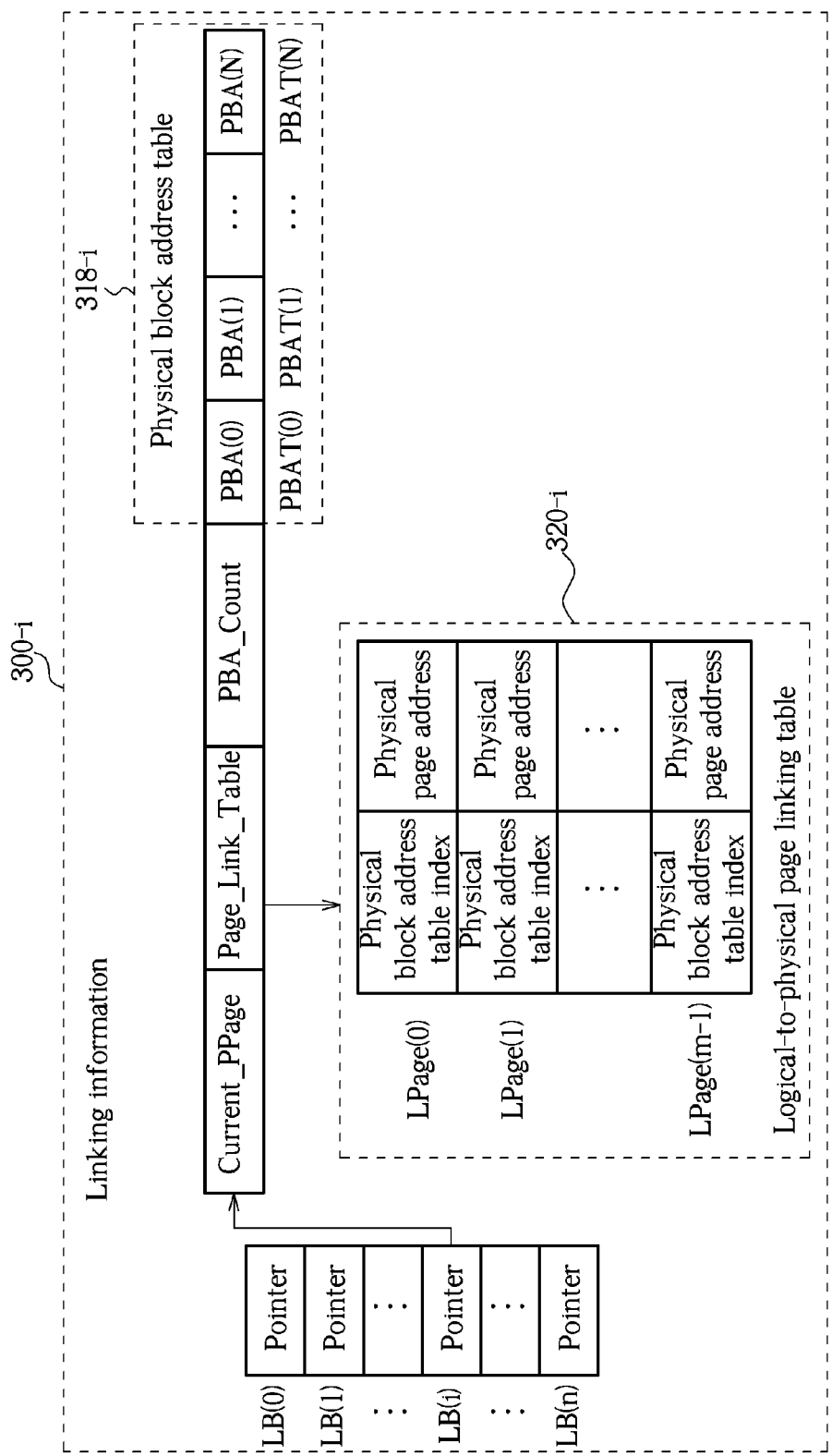
FIG. 3 illustrates linking information involved with the method shown in FIG. 2 according to an embodiment of the present invention.

FIG. 3 illustrates linking information 300-$i$ involved with the method shown in FIG. 2 according to an embodiment of the present invention. In Step 912, the aforementioned controller (e.g. the memory controller 110 that executes the program code 112C by utilizing the microprocessor 112) can record/update linking information, such as the linking information 300-$i$, regarding any logical block address LB(i), where i=0, 1, ..., or n. As shown in FIG. 3, the linking information 300-$i$ comprises current physical page location information such as current blank page location Current_PPage, a pointer Page_Link_Table pointing to the logical-to-physical page linking table 320-$i$, a physical block address count PBA_Count which is the number of a plurality of physical block addresses linking to the logical block address LB(i) (e.g. the physical block addresses PBA(0), PBA(1), ..., and PBA(N) shown in FIG. 3), and a physical block address table 318-$i$ having the plurality of physical block addresses stored therein. The current blank page location Current_PPage is utilized for indicating as to the latest page of data should be written into which physical page. In this embodiment, the physical block addresses PBA(0), PBA(1), ..., and PBA(N) respectively represent the physical blocks 0, 1, ..., and N. The controller stores the data belonging to the logical block address LB(i) by utilizing the physical blocks 0, 1, ..., and N in order, and records the physical block addresses PBA(0), PBA(1), ..., and PBA(N) in order within the physical block address table 318-$i$. This is for illustrative purposes only, and is not meant to be a limitation of the present invention. In practice, the physical block address table 318-$i$ can store the physical block address of any physical block that the controller utilizes for storing data regarding the logical block address LB(i). In particular, the controller can add/append or remove any physical block address within the physical block address table 318-$i$ at any time, and can adjust (or readjust) the locations of the physical block addresses within the physical block address table 318-$i$ when needed.

In general, the physical block addresses within the physical block address table 318-$i$ can be the physical block addresses of any portion of blocks within the plurality of blocks, and the order of these physical block addresses within the physical block address table 318-$i$ has no need to be the same as that of any portion of blocks within the plurality of blocks, and two physical block addresses respectively stored in any two adjacent fields within the physical block address table 318-$i$ have no need to be continuous. For example, after performing data access regarding the logical block address LB(i) for multiple times, the controller records the physical block addresses PBA(1024), PBA(20), PBA(8), PBA(74), ..., etc. in order within the physical block address table 318-$i$, where the physical block addresses PBA(1024), PBA(20), PBA(8), PBA(74), ..., etc. respectively represent the physical blocks 1024, 20, 8, 74, ..., etc., which are the physical blocks that are utilized for storing data belonging to the logical block address LB(i) at that time.

In this embodiment, the controller first utilizes the physical block 0 represented by the physical block address PBA(0) to record/update the data belonging to the logical block address LB(i), and records the physical block address PBA(0) in the physical block address table 318-$i$, where initially there is only the physical block address PBA(0) in the physical block address table 318-$i$, and the initial value of the physical block address count PBA_Count is equal to one. During the data access regarding the logical block address LB(i), in the logical-to-physical page linking table 320-$i$, the controller records/updates a plurality of sets of physical block address table indexes and physical page addresses, so that the data belonging to the logical block address LB(i) can be found in the future, where each row (or entry) of the logical-to-physical page linking table 320-$i$ comprises a set of physical block address table index and physical page address, and the respective rows (or entries), starting from the topmost row (or entry) through to the bottommost row (or entry), respectively correspond to the logical page addresses LPage(0), LPage(1), ..., and LPage(m−1) belonging to the logical block address LB(i).

Please note that the physical block address table indexes of this embodiment (and more particularly, those in the logical-to-physical page linking table 320-$i$) are selected from the physical block address table indexes PBAT(0), PBAT(1), ..., and PBAT(N) shown in the upper-right of FIG. 3, and the controller can respectively look up for the physical block addresses PBA(0), PBA(1), ..., and PBA(N) in the physical block address table 318-$i$ according to the physical block address table indexes PBAT(0), PBAT(1), ..., and PBAT(N). Thus, each physical block address table index stored in the logical-to-physical page linking table 320-$i$ is the representative information (or index information) of a corresponding physical block address, where the typical data amount of the representative information is less than that of the corresponding physical block address, so storing the representative information in the logical-to-physical page linking table 320-$i$ (rather than directly storing the corresponding physical block address) is helpful in saving the storage space and enhancing the overall operation performance. In addition, the physical block address table indexes PBAT(0), PBAT(1), ..., and PBAT(N) of this embodiment are respectively 0, 1, ..., and N, which are substantially the rankings of the respective fields in the physical block address table 318-$i$. As a result of this, in practice, the physical block address table 318-$i$ has no need to store the physical block address table indexes PBAT(0), PBAT(1), ..., and PBAT(N). This is for illustrative purposes only, and is not meant to be a limitation of the present invention. According to a variation of this embodiment, the physical block address table indexes PBAT(0), PBAT(1), ..., and PBAT(N) can be other values. According to another variation of this embodiment, the controller directly stores the corresponding physical block address in the logical-to-physical page linking table 320-$i$ (rather than storing the representative information). That is, in the logical-to-physical page linking table 320-$i$, the controller records/updates a plurality of sets of physical block addresses and physical page addresses, so that the data belonging to the logical block address LB(i) can be found in the future, where each row (or entry) of the logical-to-physical page linking table 320-$i$ comprises a set of physical block address and physical page address.

According to this embodiment, in the beginning of establishing the physical block address table 318-$i$, when the physical block 0 represented by the physical block address PBA(0) is fully programmed, the controller then utilizes the physical block 1 represented by the physical block address PBA(1) to record/update the data belonging to the logical block address LB(i), and records the physical block address PBA(1) in the physical block address table 318-$i$. Please note that, at the time, there are only the physical block addresses PBA(0) and PBA(1) in the physical block address table 318-$i$, and the value of the physical block address count PBA_Count is changed to be two. In this situation, once the controller has to update data regarding a certain logical page address of the logical block address LB(i), such as the logical page address LPage($m_0$), the controller updates a set of physical block address table index and physical page address corresponding to the logical page address LPage($m_0$) within the logical-to-physical page linking table 320-$i$, where the physical block address table index is updated from PBAT(0) to PBAT(1), and the physical page address is updated from the address of an old data page of the physical block 0 to the address of a new data page of the physical block 1. That is, in the logical-to-physical page linking table 320-$i$, the controller utilizes the associated linking information of a physical block having a lower ranking regarding the physical block address table 318-$i$ (i.e. a physical block having a greater physical block address table index) to update the associated linking information of a physical block having a higher ranking regarding the physical block address table 318-$i$ (i.e. a physical block having a smaller physical block address table index). This is for illustrative purposes only, and is not meant to be a limitation of the present invention. According to a variation of this embodiment, when the physical pages of a specific block are continuously written in the same order of the logical pages of a corresponding logical block, the controller may set the pointer Page_Link_Table within the linking information of the corresponding logical block to be null, in order to prevent the pointer Page_Link_Table from pointing to any logical-to-physical page linking table.

Similarly, in this embodiment, when the physical block (j−1) represented by the physical block address PBA(j−1) is fully programmed, the controller utilizes the physical block j represented by the physical block address PBA(j) to record/update the data belonging to the logical block address LB(i), and records the physical block address PBA(j) in the physical block address table 318-$i$. Please note that, at the time, there are the physical block addresses PBA(0), PBA(1), . . . , and PBA(j) stored in the physical block address table 318-$i$, and the value of the physical block address count PBA_Count is changed to be (j+1). In this situation, once the controller has to update data regarding a certain logical page address of the logical block address LB(i), such as the logical page address LPage($m_1$), the controller updates a set of physical block address table index and physical page address corresponding to the logical page address LPage($m_1$) within the logical-to-physical page linking table 320-$i$, where the physical block address table index is updated to be PBAT(j), and the physical page address is updated to be the address of a new data page of the physical block j.

Thus, the above operations extend the physical block address table 318-$i$, where the parameter j varies from 1 to N. As a result, when j=N, there are the physical block addresses PBA(0), PBA(1), . . . , and PBA(N) stored in the physical block address table 318-$i$, and the value of the physical block address count PBA_Count is changed to be (N+1).

As the value of the physical block address count PBA_Count increases, one by one the respective physical block addresses stored in the physical block address table 318-$i$ will satisfy the execution criterion disclosed in Step 914. As a result, when the block represented by any physical block address of the physical block addresses no longer has any valid page, the controller may selectively erase the block and remove the physical block address from the linking information. Thus, the present invention method and the associated memory device and the controller thereof can greatly decrease the number of merging operations of the blocks within the Flash memory and decrease the load of garbage collection operations of the invalid data pages.

According to this embodiment, when the linking information 300-$i$ indicates that there are K physical block addresses linking to the logical block address LB(i), the load of the garbage collection operations regarding the invalid data pages is approximately reduced to be (1/K) of that of the related art, which means the performance of this embodiment is approximately K times the performance of the related art. In particular, when K is greater than the number of pages in a block (e.g. m), the load of the garbage collection operations regarding the invalid data pages can be completely removed, having no need to perform any merging operation. Therefore, the present invention method and the associated memory device and the controller thereof can slow down the increase of the erase counts of the blocks in the Flash memory 120.

In contrast to the related art, the present invention method and the associated memory device and the controller thereof can enhance operation performance and decrease the number of merging operations of the blocks within the Flash memory, and even have no need to perform any merging operation. In addition, the present invention method and the associated memory device and the controller thereof can slow down the increase of the erase counts of the blocks in the Flash memory. Therefore, in contrast to the related art, portable memory devices that are implemented based upon the present invention surely have a longer lifetime.

Those skilled in the art will readily observe that numerous modifications and alterations of the device and method may be made while retaining the teachings of the invention.

What is claimed is:

1. A method for managing a plurality of blocks of a Flash memory, the method comprising:

recording/updating linking information regarding a logical block address, wherein the linking information comprises a plurality of physical block addresses linking to the logical block address, wherein each physical block address represents a block of the plurality of blocks, and recording/updating information regarding a plurality of physical page addresses of the plurality of physical block addresses respectively linking to a plurality of logical page addresses of the logical block address in a logical-to-physical page linking table, the logical-to-physical page linking table also comprising current physical page location information indicating a location of a latest written physical page, each row of the logical-to-physical page linking table comprising a set of physical block address table index and physical page address;

writing at least a logical page of the logical block to a physical page of one of the plurality of physical blocks;

when a logical page address originally linked to a first physical page address is then linked to a second physical page address, removing the linking information to the first physical page address and determining the physical page represented by the first physical page address as an invalid page;

referring to the logical-to-physical page linking table to determine blocks which have no valid page; and when a number of non-continuous blocks that are within blocks represented by the physical block addresses and have no valid page reaches a threshold which is a predetermined value greater than one, erasing all of the blocks that have no valid page and removing physical block addresses thereof from the linking information.

2. The method of claim 1, wherein the linking information further comprises current physical page location information, and the current physical page location information is utilized for indicating a location of a latest written physical page regarding the logical block address.

3. The method of claim 1, wherein the linking information further comprises page linking information; and the method further comprises:

determining that the block represented by the physical block address has no valid page according to the page linking information.

4. The method of claim 3, wherein the page linking information comprises a logical-to-physical page linking table; and the step of recording/updating the linking information regarding the logical block address further comprises:

in the logical-to-physical page linking table, regarding a logical page address belonging to the logical block address, recording/updating a corresponding physical block address or representative information thereof and further recording/updating a corresponding physical page address.

5. The method of claim 4, wherein the step of recording/updating the corresponding physical block address or the representative information thereof and further recording/updating the corresponding physical page address further comprises:

in the logical-to-physical page linking table, utilizing associated linking information of a physical block having a first index within a physical block address table to update associated linking information of a physical block having a second index within the physical block address table, wherein the first index is larger than the second index, such that the first index is listed below the second index within the physical block address table.

6. The method of claim 4, wherein the page linking information further comprises a pointer pointing to the logical-to-physical page linking table.

7. The method of claim 1, wherein the linking information further comprises a number of the physical block addresses.

8. The method of claim 1, wherein the step of selectively erasing the block and removing the physical block address from the linking information further comprises:

when a number of blocks represented by the physical block addresses reaches a predetermined value, merging valid pages of at least one portion of blocks within the blocks represented by the physical block addresses into at least one new blank block, and erasing the at least one portion of blocks and removing physical block addresses thereof from the linking information.

9. The method of claim 1, further comprising:

when physical pages of a specific block are continuously written in a same order of logical pages of a corresponding logical block, setting a pointer within linking information of the corresponding logical block to be null, in order to prevent the pointer from pointing to any logical-to-physical page linking table.

10. A memory device, comprising:

a Flash memory comprising a plurality of blocks; and a controller arranged to access the Flash memory and manage the plurality of blocks, wherein the controller records/updates linking information regarding a logical block address, the linking information comprises a plurality of physical block addresses linking to the logical block address, wherein each physical block address represents a block of the plurality of blocks, and the controller also records/updated information regarding a plurality of physical page addresses of the plurality of physical block addresses respectively linking to a plurality of logical page addresses of the logical block address in a logical-to-physical page linking table, the logical-to-physical page linking table also comprising current physical page location information indicating a location of a latest written physical page, each row of the logical-to-physical page linking table comprising a set of physical block address table index and physical page address;

wherein when a logical page address originally linked to a first physical page address is then linked to a second physical page address, the physical page represented by the first physical page address is determined as an invalid page and the controller removes the linking information to the first physical page address, the controller refers to the logical-to-physical page linking table to determine blocks which have no valid page, and when a number of non-continuous blocks that are within blocks represented by the physical block addresses and have no valid page reaches a threshold which is a predetermined value greater than one, the controller erases all of the blocks that have no valid page and removes the corresponding physical block addresses from the linking information.

11. The memory device of claim 10, wherein the linking information further comprises current physical page location information, and the current physical page location information is utilized for indicating a location of a latest written physical page regarding the logical block address.

12. The memory device of claim 10, wherein the linking information further comprises page linking information; and the controller determines that the block represented by the physical block address has no any valid page according to the page linking information.

13. The memory device of claim 12, wherein the page linking information comprises a logical-to-physical page linking table; and in the logical-to-physical page linking table, regarding a logical page address belonging to the logical block address, the controller records/updates a corresponding physical block address or representative information thereof and further records/updates a corresponding physical page address.

14. The memory device of claim 13, wherein in the logical-to-physical page linking table, the controller utilizes associated linking information of a physical block having a first index within a physical block address table to update associated linking information of a physical block having a second index within the physical block address table, wherein the first index is larger than the second index, such that the first index is listed below the second index within the physical block address table.

15. The memory device of claim 13, wherein the page linking information further comprises a pointer pointing to the logical-to-physical page linking table.

16. The memory device of claim 10, wherein the linking information further comprises a number of the physical block addresses.

17. The memory device of claim 10, wherein when a number of blocks represented by the physical block addresses reaches a predetermined value, the controller merges valid pages of at least one portion of blocks within the blocks represented by the physical block addresses into at least one new blank block, and erases the at least one portion of blocks and removes physical block addresses thereof from the linking information.

18. The memory device of claim 10, wherein when physical pages of a specific block are continuously written in a same order of logical pages of a corresponding logical block, the controller sets a pointer within linking information of the corresponding logical block to be null, in order to prevent the pointer from pointing to any logical-to-physical page linking table.

19. A controller of a memory device, the controller being utilized for accessing a Flash memory comprising a plurality of blocks, the controller comprising:

- a read only memory (ROM) arranged to store a program code; and
- a microprocessor arranged to execute the program code to control the access to the Flash memory and manage the plurality of blocks, wherein the controller that executes the program code by utilizing the microprocessor records/updates linking information regarding a logical block address, the linking information comprises a plurality of physical block addresses linking to the logical block address, wherein each physical block address represents a block of the plurality of blocks, and the controller also records/updated information regarding a plurality of physical page addresses of the plurality of physical block addresses respectively linking to a plurality of logical page addresses of the logical block address in a logical-to-physical page linking table, the logical-to-physical page linking table also comprising current physical page location information indicating a location of a latest written physical page, each row of the logical-to-physical page linking table comprising a set of physical block address table index and physical page address;

wherein when a logical page address originally linked to a first physical page address is then linked to a second physical page address, the physical page represented by the first physical page address is determined as an invalid page and the controller removes the linking information to the first physical page address, the controller refers to the logical-to-physical page linking table to determine blocks which have no valid page, and when a number of non-continuous blocks that are within blocks represented by the physical block addresses and have no valid page reaches a threshold which is a predetermined value greater than one, the controller erases all of the blocks that have no valid page and removes physical block addresses thereof from the linking information.

* * * * *